United States Patent [19]

Kondis

[11] Patent Number: 4,629,512

[45] Date of Patent: Dec. 16, 1986

[54] LEAFING ALUMINUM PIGMENTS OF IMPROVED QUALITY

[76] Inventor: Tom Kondis, 842 Stevendale Dr., Pittsburgh, Pa. 15221

[21] Appl. No.: 709,401

[22] Filed: Mar. 7, 1985

[51] Int. Cl.$^4$ .................. C09C 1/62; C04B 14/00
[52] U.S. Cl. .................. 106/290; 106/309; 241/16
[58] Field of Search ................ 106/290, 309; 241/16

[56] References Cited

U.S. PATENT DOCUMENTS

| | | | |
|---|---|---|---|
| 2,002,891 | 5/1935 | Hall | 106/290 |
| 2,185,194 | 1/1940 | Harris | 106/290 |
| 4,138,270 | 2/1979 | Ishijima | 106/290 |
| 4,443,256 | 4/1984 | Huybrechts | 106/290 |

FOREIGN PATENT DOCUMENTS 31568 10/1975 Japan .................. 106/290

*Primary Examiner*—Theodore Morris
*Attorney, Agent, or Firm*—Thomas H. Murray; Clifford A. Poff

[57] ABSTRACT

Aluminum pigments are produced by wet milling in the presence of water, employing a coupling agent to allow miscibility of water in the milling slurry, in order to compensate for inefficient aeration of commercial ball mills. Hydrogen peroxide may be employed to the same purpose without a coupling agent. This process assures the production of high quality leafing aluminum pigments.

20 Claims, No Drawings

LEAFING ALUMINUM PIGMENTS OF IMPROVED QUALITY

BACKGROUND OF THE INVENTION

Leafing quality aluminum pigments are commerically manufactured in ball mills using particulate aluminum, mineral spirits as diluent or slurrying agent, and stearic acid as lubricant. The process is generally described by Junius D. Edwards and Robert I. Wray on pages 8–11 of their book, "Aluminum Paint and Powder" (Third Edition, 1955, Reinhold Publishing Corp., Library of Congress No. 55-6623). The production of high quality leafing aluminum pigments also requires the presence of oxygen in the mill environment. For example, W. D. Jones states on page 212 of his book, "Fundamental Principles of Powder Metallurgy" (Edward Arnold Publishers, Ltd., London, 1960), ". . . it has been established that powder produced in the absence of oxygen will not leaf." U.S. Pat. No. 3,002,891, issued May 28, 1935, to E. J. Hall, also teaches the importance for oxygen being present in the mill (page 2, Section D, first column, lines 27–38).

Current production ball mills, however, are generally large, slowly rotating cylinders and they do not provide efficient aeration of the mill slurry. As a result, commercially-produced leafing pigments are manufactured under various degrees of oxygen starvation, with a resultant decrease in product pigment quality when compared with pigments milled under conditions where the nascent, developing aluminum surfaces have free access to both stearic acid and oxygen.

SUMMARY OF THE INVENTION

The present invention resides in the discovery that a hydrated aluminum oxide, formed in situ on the developing aluminum surfaces by reaction of the nascent aluminum with either water or hydrogen peroxide, is functionally equivalent or superior to the oxide formed by reaction of aluminum with oxygen, thus allowing the substitution of water or hydrogen peroxide for oxygen in the mill environment and thereby eliminating problems of imperfect aeration. Further, it has been discovered that mineral spirits, used as slurrying agent in the mill, preferentially wets the nascent aluminum surfaces and inhibits the desired competitive reaction with water, which is present as a separate phase. Therefore, a coupling agent, miscible with both water and mineral spirits, must be employed to allow water molecules to enter the mineral spirits phase in sufficient quantity to adequately compete with stearic acid molecules, already present in the mineral spirits phase, for the nascent aluminum surfaces and thereby produce high quality leafing aluminum pigments. Hydrogen peroxide molecules apparently enter the mineral spirits phase in sufficient quantity without inducement from a cosolvent so a coupling agent is not required for $H_2O_2$.

DETAILED DESCRIPTION OF THE INVENTION

Ball mills used in the manufacture of aluminum pigments are typically horizontal, steel cylinders charged with small steel balls as grinding medium. Lifter bars installed on the inner surface of the cylinder, parallel to the axis of rotation, help carry the steel balls up the side of the rotating cylinder so that they may rain or tumble down to provide the grinding action necessary for producing the tiny aluminum flakes which comprise commercial aluminum pigments. Raw aluminum feedstock charged to the mill for grinding into pigment is typically particulate such as atomized powder, chopped foil, or mechanically comminuted scrap or shavings. An inert hydrocarbon liquid, such as mineral spirits, is employed to carry the aluminum particles and to also prevent hazardous dusting of the fine product powder with its explosive consequences. Air is typically blown into open trunnions, located at each end of the ball mill on the axis of rotation, to satisfy the oxygen demand for the newly-formed aluminum surfaces and to prevent the accumulation of pyrophoric aluminum powder. This air is also the source of oxygen necessary for the production of leafing aluminum pigments. The lubricant employed for leafing aluminum pigments is preferentially stearic acid, whereas non-leafing aluminum pigments may be made from a variety of lubricants, including shorter-chained saturated carboxylic acids such as lauric acid, or unsaturated carboxylic acids such as oleic acid.

The current market for aluminum pigments has encouraged the use of larger steel cylinders for their economic manufacture. Because the volume of a cylinder increases in proportion to the base diameter squared, it becomes increasingly difficult to efficiently aerate this increased volume by the standard, state-of-the-art technique. In commercial practice, therefore, the quality of leafing pigments produced in ball mills having large diameters tends to be inferior to leafing pigments produced in smaller diameter mills. The present invention overcomes the disadvantage of oxygen gas being absent from certain areas of the mill, as, for example, deep in the mill slurry, where stearic acid may compete unopposed for the newly-formed aluminum surfaces.

The efficacy of the present invention may be described through a series of typical experimental examples. In these experiments, Alcoa grade 120 atomized aluminum powder was milled in a Matheson Model No. 804 one-liter capacity stainless steel cylinder. The grinding medium consisted of 1485 grams total assorted stainless steel balls varying from quarter inch to half inch in diameter. A standard Red Devil wrist-type paint shaker provided vibratory energy for grinding. One end of the steel cylinder was plugged, and the other end was fitted with a Whitey 43S4 stainless steel bar stock ball valve to allow control of the initial gaseous environment in the mill.

EXAMPLE I

Three mills were prepared with the following ingredients:

TABLE 1

| | Mill Run Number | | |
|---|---|---|---|
| | 1 | 2 | 3 |
| Atomized Al powder | 15 g | 35 g | 35 g |
| Stearic acid | 1.0 g | 1.75 g | 1.75 g |
| Mineral spirits | — | 50 ml | 50 ml |
| Water | 150 ml | 100 ml | 100 ml |
| Mill atmosphere | Air | Oxygen | Nitrogen |

In the case of mill run no. 2, the ambient mill atmosphere was evacuated and 15 psi oxygen was pressed in before closing the ball valve. After 2 hours milling, the mill atmosphere was evacuated again and replenished with another 15 psi oxygen. Mill run no. 3 was treated similarly, except nitrogen was substituted for oxygen.

After being milled for 3 hours, the atomized aluminum powder of mill run no. 1 was entirely converted to a hydrated oxide. This conclusion was corroborated by a pressure buildup of 430 psi in the mill, which agrees with the pressure expected from hydrogen gas generated through the following reaction:

$$2Al + 6H_2O \rightarrow 2Al(OH)_3 + 3H_2$$

In addition, the product powder dissolved in 10% aqueous sodium hydroxide solution without further generation of hydrogen gas, indicating that the powder was already completely oxidized.

After a total of 4 hours milling, the product slurries from runs 2 and 3 were filtered, and the filter cakes were incorporated into a standard asphalt roof coating formulation whose composition is provided in Table 2.

TABLE 2

Fibered Asphalt Roof Coating

|  | Parts by Weight |
|---|---|
| Sohio grade B asphalt (38% non-volatile) | 62.4 |
| Aluminum pigment (metal weight) | 13.5 |
| 7R05 asbestos fiber (Johns-Manville) | 10.7 |
| Wollastonite F-1 (Interpace Corp.) | 5.1 |
| Mineral spirits | remainder* |

*Because aluminum filter cakes vary in their percentage non-volatile contents, the amount of additional mineral spirits is adjusted so that the total weight of aluminum cake plus added mineral spirits equals 21.8 parts by weight.

The asphaltic formulations were aged 24 hours before application to test panels. Reflectance measurements were made on air-dried coatings using a TR-1 Total Reflectometer (Diano Corp.). Higher reflectance values as measured on the TR-1 indicate an increasing ability for the aluminum pigments to leaf on the black asphalt surface, thereby hiding the base asphalt more effectively and reflecting more light. Total reflectance measured on the coating from run 2 pigment was 51.1%, and that from run 3 pigment, 42.8%.

The fact that usable aluminum pigments were produced in runs 2 and 3, but not in run 1, demonstrates that mineral spirits preferentially wetted the aluminum surfaces and adequately excluded water to prevent reaction (water was present in excess needed to stoichiometrically convert all of the aluminum to the oxide). The superior quality of the run 2 pigment over run 3 pigment confirms that the expected benefits of milling in an oxygen rich environment also occur when a substantial quantity of water is present in the mill, but when the water is effectively excluded from the developing aluminum surfaces.

EXAMPLE II

Five mills were prepared with ingredients as listed in Table 3. The ambient mill atmosphere was evacuated and 30 psi oxygen or nitrogen was pressed in before closing the ball valve, the contents were milled for 3 hours, and product pigments were incorporated into the standard fibered asphalt paint system for the reflectivity measurements. Total reflectance readings are included in he tabulation. Carbitol acetate, a product of Union Carbide Corp., is the acetate ester of diethylene glycol monoethyl ether and can be represented by the chemical formula $CH_3COO(CH_2)_2O(CH_2)_2OCH_2CH_3$. It is miscible with both water and mineral spirits, has a high flash point for safety in milling, and acts as a coupling solvent to bring water into true solution in the organic mill slurry.

TABLE 3

|  | Mill Run No. | | | | |
|---|---|---|---|---|---|
|  | 4 | 5 | 6 | 7 | 8 |
| Atomized Al power | 60 g | 60 g | 60 g | 60 g | 60 g |
| Stearic Acid | 3 g | 3 g | 3 g | 3 g | 3 g |
| Mineral spirits | 70 ml | 70 ml | 35 ml | 35 ml | 35 ml |
| Carbitol acetate | — | — | 35 ml | 35 ml | 35 ml |
| Water | — | — | — | — | 0.4 ml |
| Mill Atmosphere | $N_2$ | $O_2$ | $N_2$ | $O_2$ | $N_2$ |
| Total reflectance of product pigment | 45.0% | 51.4% | 44.3% | 52.9% | 52.4% |

In runs 4 through 7, the reflectance measurements again confirm the beneficial properties imparted to leafing pigments milled with easy access to oxygen. Runs 6 and 7 indicate that carbital acetate imparts no significant or unusual changes to the product pigments, compared to their controls, runs 4 and 5. In comparing run 8 with run 6, the addition of a small quantity of water (0.7% on aluminum weight) is seen to cause substantial improvement in pigment quality when oxygen is absent from the mill. This improvement is attributed to the presence of a coupling solvent, which makes water accessible to the developing aluminum surfaces; in contrast, the copious quantity of water present in run 3 of Example I does not have such access to the developing flake particles.

EXAMPLE III

Two mills were prepared as follows, with milling and analyses performed as in Example II:

TABLE 4

|  | Mill Run No. | |
|---|---|---|
|  | 9 | 10 |
| Atomized Al powder | 60 g | 60 g |
| Stearic Acid | 3 g | 3 g |
| Mineral Spirits | 50 ml | 60 ml |
| Carbitol Acetate | 20 ml | 10 ml |
| Water | 1.0 ml | 1.0 ml |
| Mill Atmosphere | $N_2$ | $N_2$ |
| Total Reflectances of Product Pigment | 52.0% | 52.9% |

This example, along with run 8 of Example II, illustrates that the concentration of coupling solvent may be varied through a wide range with no significant change in pigment quality. The quantity of carbitol acetate employed in runs 9 and 10 is incapable of maintaining the initial total amount of water completely in organic solution; some of the water separates as a second liquid phase. However, both runs developed 1.3 atmospheres pressure beyond that of the nitrogen originally present, and this additional pressure corresponds to the pressure anticipated if all of the water reacted with aluminum to generate hydrogen gas. This indicates that, as water reacts with the developing aluminum surfaces and thereby becomes depleted from the organic phase, additional water dissolves from the aqueous phase to maintain an essentially saturated solution of water in the organic phase. Thus, the concentration of water admitted into the organic phase may be effectively controlled by proper adjustment of the coupling agent concentration.

EXAMPLE IV

The mills indicated in Table 5 were prepared in duplicate, and the contents were milled for 3 hours. The product pigments were degreased with acetone, after which the aluminum flakes were allowed to air-dry. Covering capacity on water (the area covered by a compacted layer of flakes spread on the surface of water) was determined according to the method of Edwards and Mason (Ind. Eng. Chem., Anal. Ed. 6, p. 159, 1934), and surface areas were measured by gas adsorption using a Micromeritics Instrument Corp. Model 2200 Analyzer; the test results are included in Table 5.

TABLE 5

|  | Mill Run No. | |
| --- | --- | --- |
|  | 11 | 12 |
| Atomized Al Powder | 56 g | 56 g |
| Stearic Acid | 2.9 g | 2.9 g |
| Mineral Spirits | 69 ml | 72 ml |
| Carbitol Acetate | 3 ml | — |
| Water | 1 ml | — |
| Mill Atmosphere | Air | $O_2$ |
| Available covering capacity | 12600 $cm^2/g$ | 11500 $cm^2/g$ |
| Surface area | 3.7 $m^2/g$ | 3.8 $m^2/g$ |

While conditions for run 11 specified air sealed into the milling cylinder, analysis of the atmosphere from one replicated mill following the 3-hour milling cycle failed to detect the presence of oxygen, indicating that the oxygen normally contained in the trapped air had become entirely consumed at some point during the milling cycle. Thus, run 11 represents milling under oxygen starved conditions.

The pigments milled in the coupled water system average 1100 $cm^2/g$ more available covering capacity than those milled under optimum oxygenation conditions, representing an improvement of almost 10%. However, surface areas of the two sets of pigments are comparable. These results may be interpreted to mean that the flakes milled in the water coupled system separate more easily one from another than the flakes of run 12; i.e., the coupled water system is less conductive to flake agglomeration. This is a completely unexpected result.

EXAMPLE V

Duplicate mills similar to those in Example IV were prepared according to the recipes in Table 6. These were milled for 3 hours, and the product pigments were incorporated into the standard fibered asphalt system for reflectivity measurements. As in run 11 of Example IV, runs 13 and 15 represent milling under oxygen starved conditons.

TABLE 6

|  | Mill Run No. | | |
| --- | --- | --- | --- |
|  | 13 | 14 | 15 |
| Atomized Al Powder | 56 g | 56 g | 56 g |
| Stearic Acid | 2.9 g | 2.9 g | 2.9 g |
| Mineral Spirits | 69 ml | 72 ml | 72 ml |
| Carbitol Acetate | 3 ml | — | — |
| Water | 1 ml | — | — |
| Mill Atmosphere | Air | $O_2$ | Air |
| Total reflectance of product pigments | 53.4% | 51.2% | 47.3% |

As demonstrated by the reflectance measurements of Table 6, the pigment milled under oxygen starved conditions in the absence of coupled water (run 15) is inferior to pigment milled under the other conditions depicted. The pigment milled with coupled water under oxygen starved conditions (run 13) is slightly superior to pigment milled in an oxygen enriched atmosphere in the absence of coupled water (run 14).

EXAMPLE VI

Five mills were prepared with ingredients as listed in Table 7. The contents were milled for 3 hours, and product pigments were incorporated into the standard fibered asphalt system for reflectivity measurements.

TABLE 7

|  | Mill Run No. | | | | |
| --- | --- | --- | --- | --- | --- |
|  | 16 | 17 | 18 | 19 | 20 |
| Atomized Al Powder | 56 g | 56 g | 56 g | 56 g | 56 g |
| Stearic Acid | 2.9 g | 2.9 g | 2.9 g | 2.9 g | 2.9 g |
| Mineral Spirits | 69 ml | 69 ml | 72 ml | 72 ml | 72 ml |
| Carbitol Acetate | 3 ml | 3 ml | — | — | — |
| Hydrogen Peroxide (30% strength) | — | 5 ml | — | 5 ml | — |
| Water | — | — | — | — | 5 ml |
| Mill Atmosphere | Air | Air | Air | Air | Air |
| Total reflectance of product pigment | 47.4% | 53.5% | 48.9% | 53.7% | 47.3% |

Reflectivity measurements indicate that hydrogen peroxide improves pigment quality either with (run 17) or without (run 19) a coupling solvent in the slurry, when compared with the respective control runs (16 and 18). While the water content of the hydrogen peroxide might be argued to be the critical factor in he observed improvement of run 17 through the solvent coupling action of carbitol acetate, this cannot be the case for run 19, as a comparison with uncoupled run 20 substantiates. Therefore, hydrogen peroxide must exert a real influence in improving pigment quality. The fact that a coupling solvent is not needed to extract the benefits of hydrogen peroxide suggests that hydrogen peroxide is sufficiently soluble in the organic slurry to have access to the developing aluminum flake surfaces.

The foregoing examples illustrate the inventive concept that water, when properly made available to the developing aluminum surfaces through employment of a coupling agent, or hydrogen peroxide, adequately maintain aluminum pigment leafing quality when oxygen is temporarily unavailable during the pigment milling operation. The mechanism behind this favorable action is thought to reside in a competition with stearic acid for the developing aluminum surfaces by the oxygen, water, or hudrogen peroxide molecules. The reason why a comingling on the aluminum surface of aluminum stearate with the resultant oxides or hydrous oxides is important, is not known. It is well known in the art that stearic acid attaches itself to the aluminum surfaces during milling through chemical bonds to produce an aluminum stearate compound at the surface, and that this occurs in the presence or absence of oxygen.

An unexpected benefit of this invention, as demonstrated by Example IV, is the lesser agglomerated condition of pigments milled in the coupled water system as compared with state-of-the art pigments milled under efficient aeration. This condition is beneficial not only to leafing pigments, but is also expected to produce nonleafing pigments having improved tinting strength through more efficient deployment of the flakes throughout a paint vehicle.

While the acetate ester of diethylene glycol monoethyl ether has been employed throughout as coupling agent, this choice is not considered to be critical. The use of stearic acid as preferred lubricant for the production of leafing aluminum pigments does not imply the exclusion of other lubricants, such as behenic acid, which are sometimes employed towards this end.

The examples illustrate that a wide concentration range of coupling agent in milling diluent is effective in achieving the desired results, and that this range varied from about 4% to about 50% of the total liquid volume. The actual concentration preferred in practice will be based on economic considerations such as initial material cost and volatility losses, but will not be less than the quantity needed to present sufficient water molecules to the developing aluminum surfaces. Such lower limit will depend directly on the amount of aluminum metal contained in the ball mill to be comminuted into pigment flake. For practical purposes, however, the preferred concentraion of coupling agent is expected to fall within the approximate range 2-20% of the total liquid volume.

The quantity of water necessary to achieve the desired results is relatively low, being just 0.7% of the aluminum weight in run 8 of Example II. Caution must be exercised to avoid making an excessive amount of water available to the developing aluminum surfaces, as such excess water may react in bulk with aluminum particles and reduce the metallic character of the product pigments by comingling hydrous aluminum oxide particles with metallic aluminum pigment particles. On the other hand, too little water may result in complete depletion of water molecules early in the milling cycle through reaction with aluminum surfaces to that essentially no more water is available for a significant portion of the milling cycle. Further, the design of some ball mills may allow loss of water through evaporation, leading to like nonavailability. The preferred concentration of water is therefore approximately 0.5-10.0% by weight based upon the weight of aluminum feedstock charged to the mill. Water may be added incrementally throughout the milling cycle to minimize the effect of depletion through evaporation and reaction.

I claim as my invention:

1. A process for producing leafing pigments which comprises milling aluminum particles in the presence of a liquid hydrocarbon, a milling lubricant, a coupling agent and water.

2. The process of claim 1 in which the liquid hydrocarbon is mineral spirits.

3. The process of claim 1 in which the milling lubricant is stearic acid.

4. The process of claim 1 in which the milling lubricant is behenic acid.

5. The process of claim 1 in which the milling lubricant is any of those commonly employed in the production of nonleafing aluminum pigments.

6. The process of claim 1 in which the coupling agent is the acetate ester of diethylene glycol monoethyl ether.

7. The process of claim 1 in which the coupling agent comprises approximately 2-20% of the total liquid volume.

8. The process of claim 1 in which the concentration of water is approximately 0.5-10.0% by weight based on the weight of aluminum particles.

9. The process of claim 1 in which the water is added incrementally throughout the milling operation.

10. A process for producing leafing pigments which comprises milling aluminum particles in the presence of a liquid hydrocarbon, a milling lubricant and hydrogen peroxide.

11. The process of claim 10 in which the liquid hydrocarbon is mineral spirits.

12. The process of claim 10 in which the milling lubricant is stearic acid.

13. A composition of matter as produced in the process of claim 10.

14. A composition of matter as produced in the process of claim 1.

15. A composition of matter as produced in the process of claim 5.

16. The method of producing leafing-quality aluminum pigment which comprises, in a ball mill of such substantial size as to yield a poor product because of oxygen starvation, the step of milling together, in appropriate proportions, a mixture of aluminum pieces, long-chain organic acid, liquid hydrocarbon, and mixture of water plus coupling agent, said milling operation being one which comminutes the aluminum particles and generates new surfaces of aluminum.

17. A method as defined in claim 16, wherein said long-chain organic acid is selected from the group consisting of stearic acid and behenic acid.

18. A method as defined in claim 16, wherein said liquid hydrocarbon is mineral spirits.

19. A method as defined in claim 16, wherein said coupling agent is the acetate ester of diethyleneglycolmonoethyl ether.

20. In the method of producing leafing-quality aluminum pigment in a ball mill of such substantial size as to yield a poor product because of oxygen starvation, the step of milling together, in appropriate proportions, a mixture of aluminum pieces, long-chain organic acid, liquid hydrocarbon, and aqueous hydrogen peroxide, said milling operation being one which comminutes the aluminum particles and generates new surfaces of aluminum.

* * * * *